United States Patent
Do et al.

(10) Patent No.: US 6,882,075 B2
(45) Date of Patent: Apr. 19, 2005

(54) BOBBIN FOR RECIPROCATING MOTOR AND FABRICATION METHOD THEREOF

(75) Inventors: Jin-Yoong Do, Changwon (KR); Won-Hyun Jung, Changwon (KR); Hyeong-Suk Kim, Changwon (KR); Si-Hang Jeon, Busan (KR); Hyung-Pyo Yoon, Changwon (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 10/297,841

(22) PCT Filed: May 25, 2001

(86) PCT No.: PCT/KR01/00880
§ 371 (c)(1),
(2), (4) Date: Dec. 11, 2002

(87) PCT Pub. No.: WO02/087060
PCT Pub. Date: Oct. 31, 2002

(65) Prior Publication Data
US 2003/0137209 A1 Jul. 24, 2003

(30) Foreign Application Priority Data
Apr. 19, 2001 (KR) .......................... 2001-21165

(51) Int. Cl.⁷ .................................................. H02K 1/00
(52) U.S. Cl. ..................... 310/194; 310/49 R; 310/15
(58) Field of Search ...................... 310/14, 17, 23–24, 310/49 R, 194

(56) References Cited

U.S. PATENT DOCUMENTS

| 2,892,598 | A | * | 6/1959 | Dudley ..................... 242/602.2 |
| 4,988,055 | A | * | 1/1991 | Sakai et al. .................. 242/159 |
| 5,174,013 | A | * | 12/1992 | Hiroshima et al. ........... 29/605 |
| 5,574,324 | A | * | 11/1996 | Hirama et al. ............... 310/194 |
| 5,714,822 | A |   | 2/1998 | Kawano et al. |
| 2002/0105245 | A1 | * | 8/2002 | Park ........................... 310/218 |

FOREIGN PATENT DOCUMENTS

| JP | 5-006817 A | 5/1993 |
| JP | 9-129436 A | 5/1997 |
| JP | 10-323009 A | 12/1998 |
| JP | 2000-230578 A | 8/2000 |
| JP | 2001-45692 A | 2/2001 |
| JP | 2001-57767 A | 2/2001 |

* cited by examiner

*Primary Examiner*—Thanh Lam
(74) *Attorney, Agent, or Firm*—Birch Stewart Kolasch & Birch, LLP

(57) ABSTRACT

A bobbin for a reciprocating motor and fabricating method thereof includes the bobbin comprising a bobbin body (310) including a first sidewall unit (312) and a second sidewall unit (313) forming a certain space in the body by extending at a certain height so as to have slopped part from both side of the bottom (311) having a ring form with a certain width; a winding coil (320) wound a plurality of times in the space of inner side of the bobbin body; (310) and a cover (330) couple to the bobbin body (310) so as to cover the winding coil (320), and a molding step for fabricating the bobbin, thereby fabrication of the winding coil and laminated outer core constituting the motor is simplified, the length of the permanent magnet constituting the mover can be shortened. So, fabricating cost of the motor can be reduced and mass productivity of the motor can be improved.

11 Claims, 4 Drawing Sheets

US 6,882,075 B2

BOBBIN FOR RECIPROCATING MOTOR AND FABRICATION METHOD THEREOF

This application is the national phase under 35 U.S.C. § 371 of PCT International Application No. PCT/KR01/00880 which has an International filing date of May 25, 2001, which designated the United States of America.

TECHNICAL FIELD

The present invention relates to a bobbin of a reciprocating motor, and more particularly, to an improved bobbin of a reciprocating motor that is capable of reducing an amount of a permanent magnet to be used for constituting a reciprocating motor which generates a linear reciprocal driving force and suitable to a mass-production of a motor, and a fabrication method thereof.

BACKGROUND ART

In general, a motor is an instrument for converting an electric energy to a kinetic energy. There are two types of motors: one is a rotary motor which converts the electric energy to a rotational movement, and the other is a reciprocating motor which converts the electric energy to a linear reciprocal movement.

As a driving source, the motor is adopted for use to various fields. Especially, it is installed in almost every home appliance such as a refrigerator, an air-conditioner, a washing machine or an electric fan.

In case of the refrigerator and the air-conditioner, the motor is not only used to rotate a ventilating fan but also installed as a driving source at a compressor of a cooling cycle apparatus of the refrigerator and the air-conditioner.

FIG. 1 is an example of a general reciprocating motor in accordance with a conventional art.

As shown in FIG. 1, the reciprocating motor includes a stator having a cylindrical outer core 10 and an inner core 20 inserted into the outer core 10 with a predetermined space, a winding coil 30 combined to the outer core 10 or the inner core 20, and a mover 40 inserted linearly movable between the outer core 10 and the inner core 20.

FIG. 1 shows the structure in which the winding coil 30 is combined with the outer core 10.

The outer core 10 is formed as a cylindrical stacked body in which channel-shaped thin lamination sheets 11 are stacked radially to make a cylindrical form.

The channel portion of the lamination sheet 11 makes a pass part 11a where a flux flows, and both ends make pole parts 11b where a pole is formed. The space with one side opened formed inside the pass part 11a makes an opening 11c in which the winding coil 30 is positioned.

Referring to the winding coil 30, a coil is wound for a plurality of times to form a ring shape, a section form of which is equivalent to the form of the opening 11c.

A thin insulation coating film 31 is formed on the outer surface of the winding coil 30.

The inner core 20 is formed as a cylindrical stacked body that a thin rectangular lamination sheet 21 having a length equivalent to the length of the outer core 10 is stacked radially to make a cylindrical form.

The mover 40 includes a cylindrical magnet holder 41 inserted between the outer core 10 and the inner core 20 and a plurality of permanent magnets 2 fixedly combined to the outer circumferential surface of the magnet holder 41.

The length Lp of the permanent magnet 42 is usually equivalent to the sum of the length Lp of the pole part and the interpole distance Lb. Accordingly, since the length of the permanent magnet 42 is in proportion to the interpole distance Lb positioned at both sides of the opening 11c, the shorter the interpole distance Lb is, the shorter Lm of the permanent magnet 42 becomes.

The length Lp of the pole part corresponds to the stroke, and the interpole distance Lb is equivalent to the width of the entrance of the opening 11c.

As for the combination between the winding coil 30 and the outer coil 10, the insulation coating film 31 is coated at the outer side of the winding coil 30 formed as a coil is wound in a ring-shape for many of times, and the lamination sheets 11 constituting the outer core 10 are stacked to be combined radially at the winding coil 30.

The lamination sheets 11 are stacked such that the winding coil 30 is inserted into the opening 11c.

The operation of the reciprocating motor constructed as described above will now be explained with reference to FIG. 2.

As shown in FIG. 2, when a current flows to the winding coil 30, a flux is generated around the winding coil 30 due to the current flowing along the winding coil 30. The flux flows to form a closed loop along the pass part 11a of the outer core and the inner core 20 which constitute the stator (S).

The interaction between the flux according to the current flowing along the coil 30 and the flux according to the permanent magnet 42 constructing the mover 40 makes the permanent magnet 42 to move in the axial direction.

When the direction of the current flowing to the winding coil 30 is changed, the direction of the flux formed at the pass part 12 of the outer core and the inner core 20 is accordingly changed, and thus, the permanent magnet 42 is moved in the opposite direction.

When the current is supplied to the permanent magnet 42 by changing its direction by turns, the permanent magnet 42 is moved linearly and reciprocally between the outer core 10 and the inner core 20. Accordingly, the mover 40 has a linear reciprocal driving force.

However, the reciprocating motor having the above described construction has many problems.

For example, first, since the width of the entrance of the opening 11c where the winding coil 30 is positioned, that is, the interpole distance Lb, is great, causing that the size of the high-priced permanent magnet 42 which is determined depending on the interpole distance Lb is lengthened. Thus, as the amount of the permanent magnet 42 to be used is increased, a high production cost is incurred which is not suitable to a mass-production.

Secondly, since the outer core 10 is constructed by stacking the plurality of lamination sheets 11 at the winding coil 30 after the winding coil 30, which is formed by winding the coil having a predetermined length many times, is coated for insulation, it is not easy to fabricate the winding coil 30 in conformity to the form of the opening 11c of the outer core 10.

In addition, since the winding coil 30 is easily deformed, making it difficult to stack the lamination sheets 11, the fabrication time is much taken and more processes are required, and thus, it is not suitable to a mass-production.

DISCLOSURE OF THE INVENTION

Therefore, it is an object of the present invention to provide a bobbin of a reciprocating motor that is capable of reducing an amount of a permanent magnet to be used for a reciprocating motor which generates a linear reciprocal driving force and suitable to a mass-production, and its fabrication method.

To achieve these objects, there is provided a bobbin of a reciprocating motor including: a bobbin body having a first side wall part and a second side wall part which are respectively extended to a predetermined height to have a tilt portion at both sides of a ring-shaped bottom of a predetermined width to thereby form a predetermined space therein; a winding coil formed by winding a coil for several times at a space formed inside the bobbin body; and a cover combined with the bobbin body to cover the winding coil.

To achieve the above objects, there is also provided a method for fabricating a bobbin of a reciprocating motor including the steps of: first-molding the bobbin body having the first side wall part and the second side wall part which form a predetermined space therein by being extended to a predetermined height to have a tilt portion at both sides of the ring-shaped bottom of a predetermined width; fabricating a winding coil by winding a coil for plural times at the space formed inside the bobbin body; and second-molding the cover combined with the bobbin body to cover the winding coil.

MODES FOR CARRYING OUT THE PREFERRED EMBODIMENTS

A bobbin of a reciprocating motor and its fabrication method in accordance with a preferred embodiment of the present invention will now be described with reference to the accompanying drawings.

Figure 1:
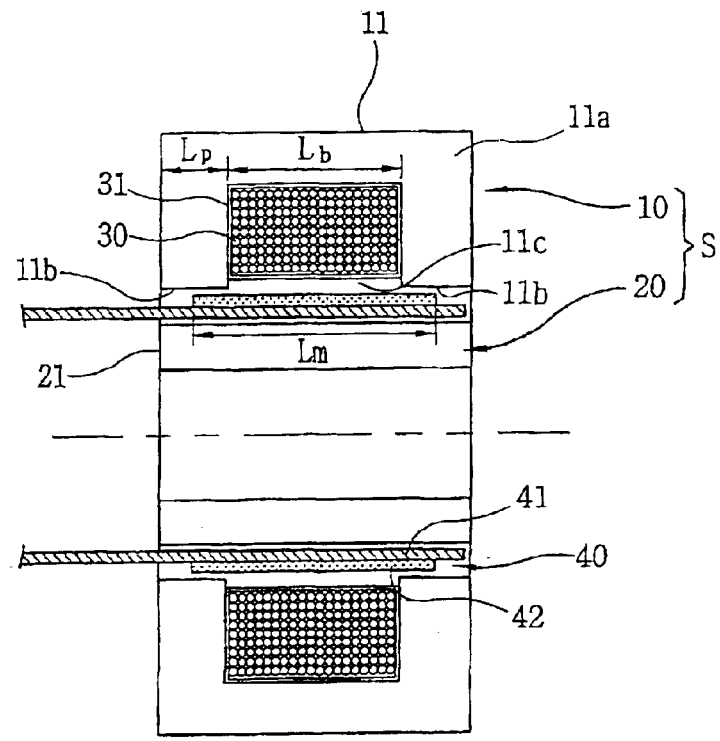
FIG. 1 is a front-sectional view of a general reciprocating motor in accordance with a conventional art.
Figure 2:
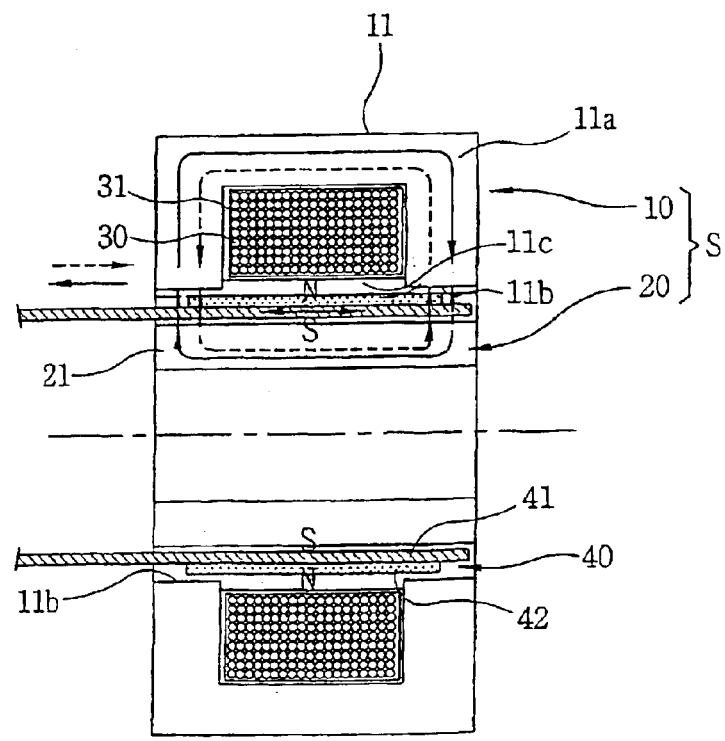
FIG. 2 is a front-sectional view illustrating an operational state of the reciprocating motor in accordance with the conventional art.
Figure 3:
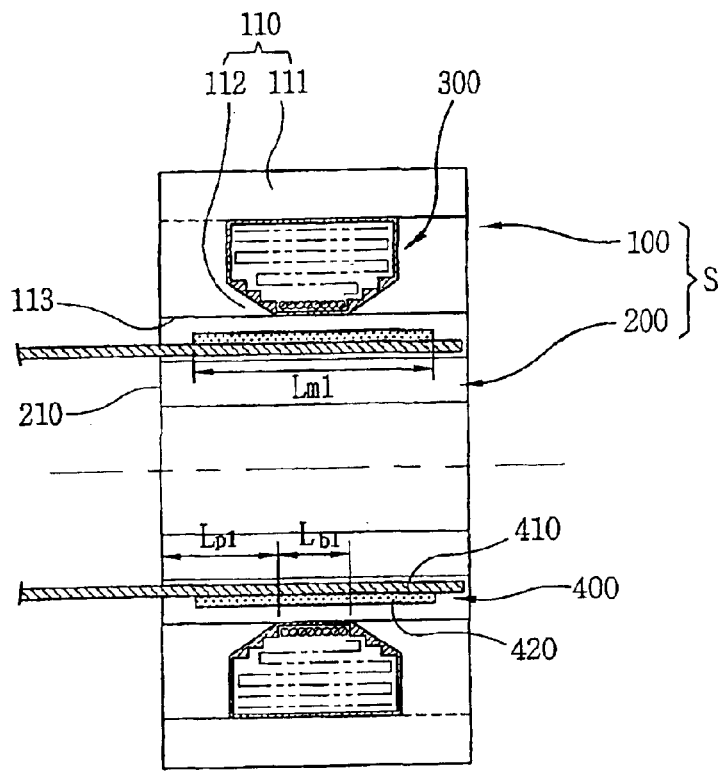
FIG. 3 is a front-sectional view of a reciprocating motor with a bobbin in accordance with a preferred embodiment of the present invention.

FIG. 3 is a front-sectional view of a reciprocating motor with a bobbin in accordance with a preferred embodiment of the present invention.

As shown in FIG. 3, a cylindrical inner core 200 is combined inside the cylindrical outer core 100 with a predetermined interval. The outer core 100 and the inner core 200 constitute a stator (S).

A bobbin 300 is combined with the outer core 100 of the stator. The bobbin 300 may be combined with the inner core 200.

A mover 400 is inserted to be linearly movable between the outer core 100 and the inner core 200.

The mover 400 includes a cylindrical magnet holder 410 inserted between the outer core 100 and the inner core 200 and a plurality of permanent magnets 420 combined at the outer circumferential surface of the magnet holder 410.

Figure 4:
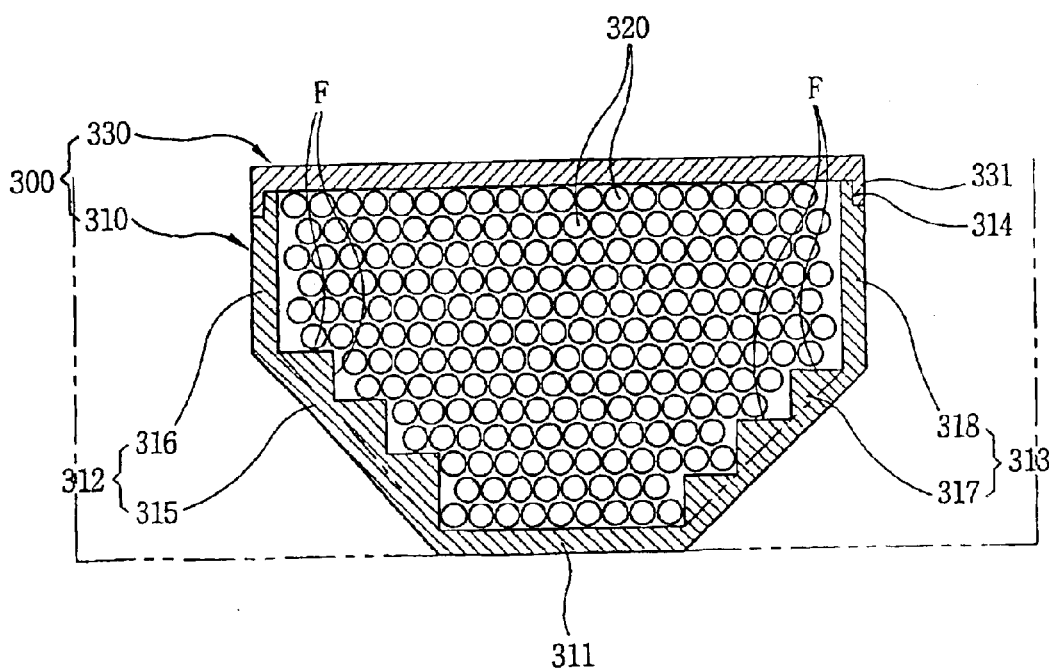
FIG. 4 is a front-sectional view of a bobbin of a reciprocating motor in accordance with the preferred embodiment of the present invention.

With reference to FIG. 4, the bobbin 300 includes: a bobbin body having a first side wall part 312 and a second side wall part 313 which are respectively extended to a predetermined height to have a tilt portion at both sides of a ring-shaped bottom 311 of a predetermined width to thereby form a predetermined space therein; a winding coil 320 formed by winding a coil for several times at a space formed inside the bobbin body 310; and a cover 330 combined with the bobbin body to cover the winding coil.

A first combining part 314 is formed at both end faces of the first side wall part 312 and the second side wall part 313 of the bobbin body 310, and a second combining part 331 is provided to be combined with the first combining part 314 at the inner face of the cover 330.

The first combining part 314 and the second combining part 331 are formed to be concavo-convex for mutual combination. That is, the first combining part 314 is formed by having a recess having a predetermined width and depth at the end faces of the first side wall part 312 and the second side wall part 313, and the second combining part 331 has a protrusion having a predetermined width and length corresponding to the form of the recess at both sides of the cover 330.

Or, reversely, the first combining 314 may be formed having a protrusion with a predetermined width and height at the end faces of the first side wall part 312 and the second side wall part 313 while the second combining part 331 may include a recess having a predetermined width and depth corresponding to the form of the protrusion at both sides of the cover 330.

The protrusion and the recess to be combined with the protrusion may be formed by plural ones.

The first side wall part 312 includes a first slant wall 315 extendedly formed to having a predetermined slope angle to a bottom part 311 at one side of the bottom part 311, and a first vertical wall 316 extendedly formed from the first slant wall 315 in the vertical direction to the bottom part 311.

The first slant wall 315 has a predetermined thickness and is slanted outwardly of the bottom part 311. That is, it makes an obtuse angle to the bottom part 311.

The second side wall part 313 includes a second slant wall 317 extendedly formed to having a predetermined slope angle to the bottom part 311 at the other side of the bottom part 311, and a second vertical wall 318 extendedly formed from the second slant wall 317 in the vertical direction to the bottom part 311.

The second slant wall 317 has a predetermined thickness and is formed slant to make an obtuse angle to the bottom part 311 outwardly of the bottom part 311.

It is preferred that the first slant wall 315 and the second slant wall 317 have the same slope angle and the first vertical wall 316 and the second vertical wall 318 are formed in parallel.

A plurality of step faces (F) are formed at the inner faces of the first slant wall 315 and the second slant wall 317.

It is preferred that the step faces (F) have a stairway form, and the step face (F) formed at the first slant wall 315 and the step face (F) formed at the second slant wall 317 have different heights to each other.

Figure 5:
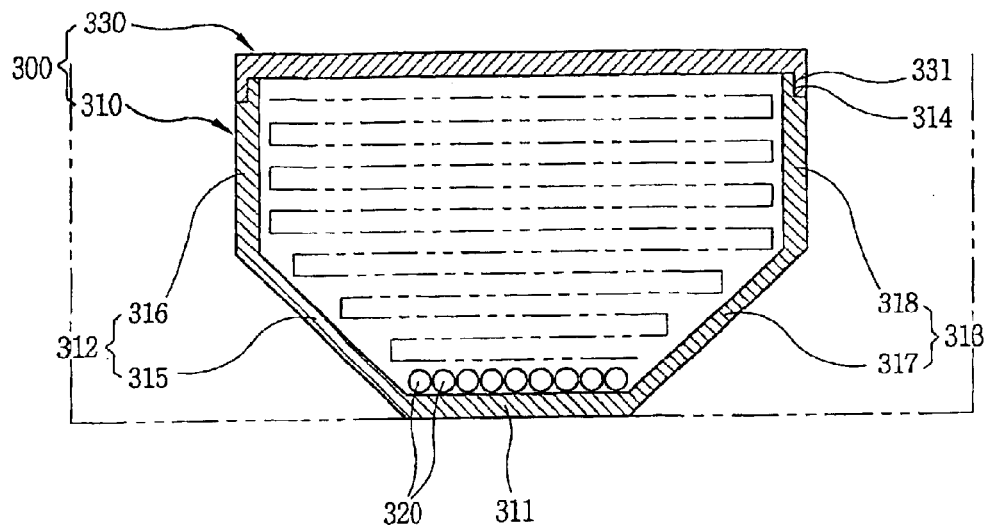
FIGS. 5 and 6 are front-sectional views illustrating modifications of the bobbin of a reciprocating motor in accordance with the preferred embodiment of the present invention.

FIG. 5 is a modification of the first slant wall 315 and the second slant wall 317.

As shown in FIG. 5, the first slant wall 315 and the second slant wall 317 are formed to have a predetermined thickness, respectively.

Figure 6:
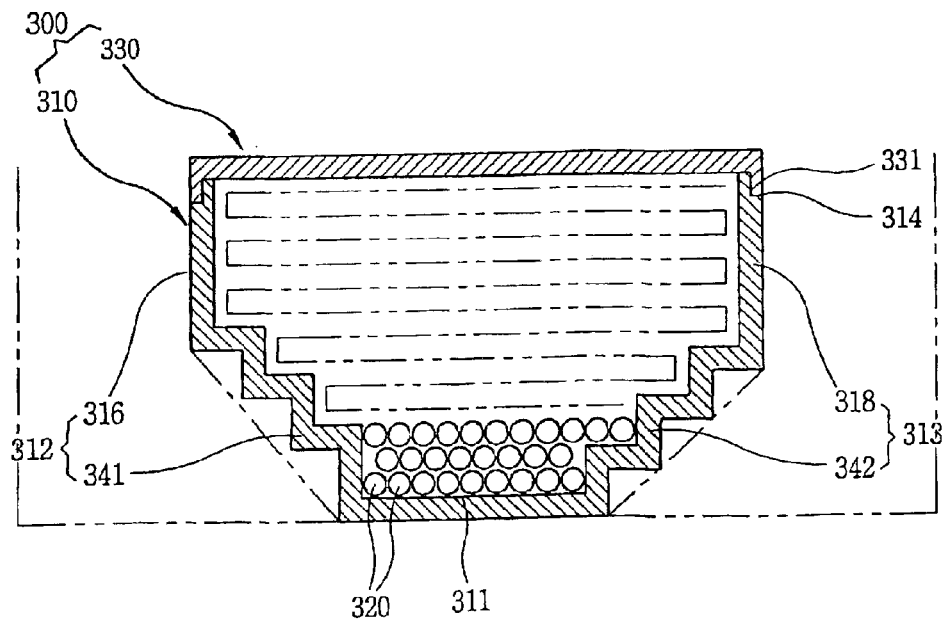

FIG. 6 is a modification of the first side wall part 312 and the second side wall part 313.

As shown in FIG. 6, the first side wall part 312 includes a first slant step wall 341 formed in a stairway form and having a predetermined thickness at one side of the bottom part 311 and a first vertical wall 316 extendedly formed from the first slant step wall 341 in the vertical direction to the bottom part 311.

The second side wall part 313 includes a second slant step wall 342 formed in a stairway form and having a predetermined thickness at one side of the bottom part 311 and a second vertical wall 318 extendedly formed from the first slant step wall 342 in the vertical direction to the bottom part 311.

It is preferred that the levels of the first slant step wall 341 and those of the second slant step wall 342 are different.

Figure 7:
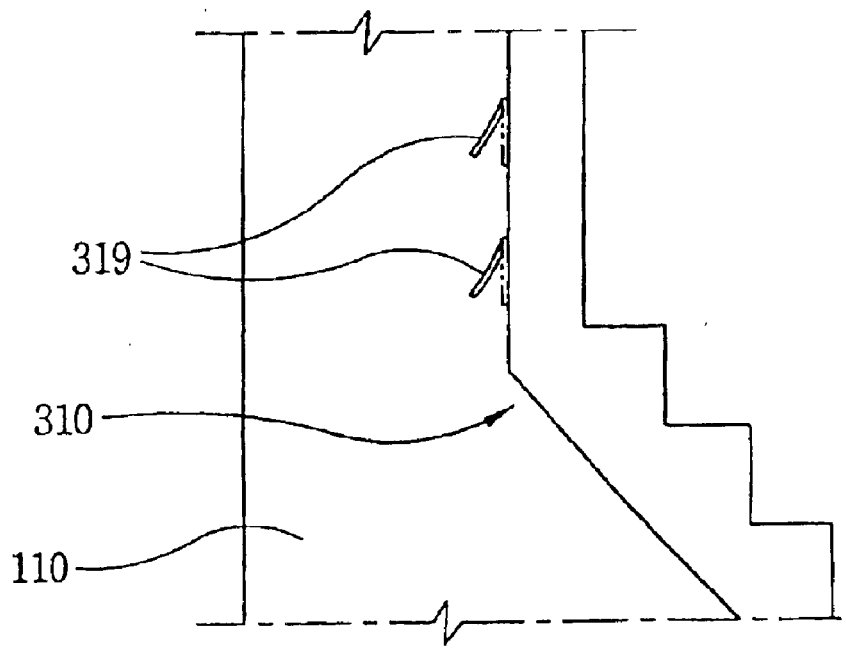
FIG. 7 is a sectional view illustrating a protrusive louver of the bobbin of a reciprocating motor in accordance with the preferred embodiment of the present invention.

With reference to FIG. 7, a protrusive louver 319 is formed at the whole or a partial outer face of the first wide wall 312 and the second side wall part 313, so as to be closely adhered to a motor core when combined with the motor core.

The winding coil 320 is formed by winding a coil for many times inside the bobbin body 310.

The coil starts winding in zigzag, in the longitudinal direction of the bottom part 311, from the corner where the bottom part 311 and the first side wall part 312 meet or the corner where the bottom part 311 and the second side wall part 312 meet. In this respect, the coil is horizontally arranged to be wound in the longitudinal direction by the step faces (F) formed at the first slant wall 315 and the second slant wall 317.

The winding coil is positioned at the internal space formed by the bottom part 311 of the bobbin body 310 and the first and the second side wall parts 312 and 313.

It is preferred that the bobbin body 310 and the cover 330 are integrally shaped by molding.

The outer core 100 is formed such that lamination sheets 100 consisting of an 'L'-shaped pass part 111 and an extended part 112 extended in a triangle form at an inner side of one end of the pass part 111 are radially stacked to make a cylindrical form in the bobbin 300.

One lamination sheet 110 is radially stacked such that the extended part 112 contacts with the first slant wall 315 of the first side wall part of the bobbin 300 and the pass part 111 contacts with the outer faces of the first vertical wall 316 of the first side wall part and the cover of the bobbin 300, and a different lamination sheet 110 is radially stacked to be contacted with the outer faces of the second slant wall 317 and the second vertical wall 318 of the second side wall part and the cover 330 of the bobbin 300.

In this manner, the plurality of lamination sheets 110 are radially stacked to make a cylindrical form on the basis of the bobbin 300.

The end portion of the extended part 112 and the end portion of the pass part 111 positioned at both sides of the bottom part 311 of the bobbin makes a pole part 113 which forms a pole, and the distance between the pole parts 113 makes an interpole distance Lb1. The interpole distance Lb1 is equivalent to the width of the bottom part 311 of the bobbin.

The length Lm1 of the permanent magnet 420 of the mover 400 is equivalent to the sum of the width Lb1 of the bottom part 311 of the bobbin, that is the distance between the pole parts 113, and the length Lp1 of one pole part 113.

The inner core 200 is formed as a cylindrical stacked body that rectangular thin lamination sheets 210 having the length equivalent to the length of the outer core 100 are radially stacked to make a cylindrical form.

Figure 8:
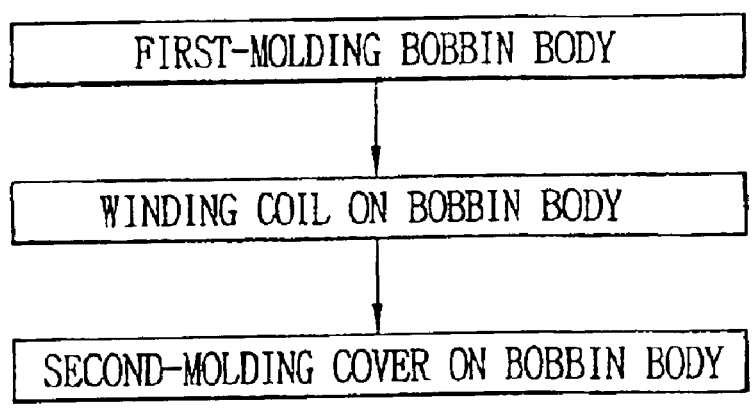
FIG. 8 is a flow chart of a method for fabricating the bobbin of a reciprocating motor in accordance with the preferred embodiment of the present invention.

FIG. 8 is a flow chart of a method for fabricating the bobbin of a reciprocating motor in accordance with the preferred embodiment of the present invention.

As shown in FIG. 8, the bobbin body 310 having the first side wall part 312 and the second side wall part 313 which are respectively extended to a predetermined height having a slant portion at both sides of the ring-shaped bottom part 311 of a predetermined width and form a space therein is first molded by using a resin.

And then, the winding coil 320 is fabricated by winding a coil for many times in the space formed inside the bobbin body 310. The winding coil 320 is positioned at the inner space formed by the bottom part 311 and the first and the second side wall parts 312 and 313 of the bobbin body 310.

The cover 330 is secondly molded to the bobbin body 310 to cover the winding coil 320. The cover 330 is preferably made of a resin.

The operational effects of the bobbin of the reciprocating motor and its fabrication method will now be described.

First, in the reciprocating motor, when a current flows to the winding coil 320, a flux is generated around the winding coil 320 due to the current flowing to the winding coil 320. The flux flows forming a closed loop along the outer core 100 and the inner core 200 constituting the stator (S).

The interaction between the flux according to the current flowing along the coil 320 and the flux according to the permanent magnet 420 constituting the mover 400 makes the permanent magnet 420 to move in the axial direction.

When the direction of the current flowing to the winding coil 320 is changed, the direction of the flux formed at the outer core 100 and the inner core 200 is accordingly changed, and thus, the permanent magnet 420 is moved in the opposite direction.

When the current is supplied to the permanent magnet 420 by changing its direction by turns, the permanent magnet 420 is moved linearly and reciprocally between the outer core 100 and the inner core 200. Accordingly, the mover 40 has a linear reciprocal driving force. This process is the same as described above.

In the bobbin 300 of the reciprocating motor, the winding coil 320 is formed as a coil is wound for many times therein. Thus, the winding coil 320 can be easily fabricated. In addition, the plurality of lamination sheets 110 are stacked on the bobbin 300 having the winding coil 320 therein, to thereby fabricate the outer core 100, so that the operation of stacking the lamination sheets 110 is easily performed. Moreover, the dimension of the outer core 100, that is, the stacked body, is accurate and the dimension management is facilitated.

The slant wall is formed at the first and the second side wall parts 312 and 313 of the bobbin body 310, and as the lamination sheets 110 are stacked as being contacts with the slant wall to form the outer core 100, the distance between the pole parts 113 of the outer core, that is, the interpole distance Lb1, is reduced, leading to reduction to the length Lm1 of the permanent magnet 420 constituting the mover 400.

Furthermore, since the step faces (F) are formed at the first and the second side wall parts 312 and 313 of the bobbin, the coil is closely wound without being pushed. Thus, the number of winding of the winding coil wound inside the bobbin 300 can be relatively increased.

The bobbin 300 includes the bobbin body 310 and the cover 330, the first combining part 314 is formed at the bobbin body 310, and the second combining part 331 is formed at the cover 330. And then, as the first and the second combining parts 314 and 331 are combined, the cover 330 is combined to the bobbin body 310. Thus, the parts are simply combined and their combination states are firm.

In addition, since the protrusive louver 319 is formed at the outer face of the bobbin body 310, the stacked body is firmly stacked at the bobbin 300, that is, the outer core 100 and the bobbin are tightly adhered, so that a vibration noise possibly caused due to shaking between the bobbin 300 and the stacked body during an operation of the motor can be prevented.

Meanwhile, as for the method for fabricating the bobbin of the reciprocating motor, after the bobbin body 310 constituting the bobbin 300 is molded by resin, on which the coil is wound for many times, and then the bobbin body 310 and the cover 330 are molded to integrate them. Thus, the production process is simple and the combination state is maintained firm.

As so far described, the bobbin of the reciprocating motor and its fabrication method have many advantages.

For example, first, the winding coil and the outer core can be easily fabricated.

Secondly, as the length of the permanent magnet constituting the mover is reduced, the unit cost for a production of a motor can be reduced as well as heightening its productivity.

It will be apparent to those skilled in the art that various modifications and variations can be made in the plasma polymerization on the surface of the material of the present invention without departing from the spirit or scope of the invention. Thus, it is intended that the present invention cover modifications and variations of this invention provided they come within the scope of the appended claims and their equivalents.

What is claimed is:

1. A bobbin of a reciprocating motor comprising:
    a bobbin body having a first side wall part and a second wall part which are respectively extended to a predetermined height to have a tilt portion at both sides of a ring-shaped bottom of a predetermined width to thereby form a predetermined space therein;
    a winding coil formed by winding a coil for several times at a space formed inside the bobbin body; and
    a cover combined with the bobbin body to cover the winding coil.

2. The bobbin of claim 1, wherein a first combining part is formed at the end faces of the first and the second side wall parts of the bobbin body and a second combining part is formed at the inner face of the cover and combined with the first combining part.

3. The bobbin of claim 2, wherein the first and the second combining parts are concavo-convex for mutual combination.

4. The bobbin of claim 1, wherein a plurality of recesses are formed at end faces of the first and the second side wall parts of the bobbin body and a plurality of protrusions are formed to be combined with the recesses at the lower surface of the cover so that the protrusions of the cover can be combined with the recesses of the bobbin body.

5. The bobbin of claim 1, wherein the first side wall part includes a first slant wall having a predetermined thickness extendedly formed to having a predetermined slope angle to a bottom part at one side of the bottom part, and a first vertical wall extendedly formed from the first slant wall in the vertical direction to the bottom part, and the second side wall part includes a second slant wall having a predetermined thickness extendedly formed to having a predetermined slope angle to the bottom part at the other side of the bottom part, and a second vertical wall extendedly formed from the second slant wall in the vertical direction to the bottom part.

6. The bobbin of claim 5, wherein a plurality of step faces are formed at the inner faces of the first slant wall and the second slant wall.

7. The bobbin of claim 1, wherein the first side wall part includes a first slant step wall formed in a stairway form and having a predetermined thickness at one side of the bottom part and a first vertical wall extendedly formed from the first slant step wall in the vertical direction to the bottom part, and the second side wall part includes a second slant step wall formed in a stairway form and having a predetermined thickness at one side of the bottom part and a second vertical wall extendedly formed from the first slant step wall in the vertical direction to the bottom part.

8. The bobbin of claim 1, wherein a protrusive louver is formed at the whole or a partial outer face of the first wide wall and the second side wall part, so as to be closely adhered to a motor core when combined with the motor core.

9. The bobbin of claim 1, wherein the bobbin body and the cover are integrally shaped by molding.

10. A method for fabricating a bobbin of a reciprocating motor comprising the steps of:
    first-molding the bobbin body having the first side wall part and the second side wall part which form a predetermined space therein by being extended to a predetermined height to have a tilt portion at both sides of the ring-shaped bottom of a predetermined width;
    fabricating a winding coil by winding a coil for plural times at the space formed inside the bobbin body; and
    second-molding the cover combined with the bobbin body to cover the winding coil.

11. A bobbin of a reciprocating motor comprising:
    a bobbin body manufactured by molding, the bobbin body having a first side wall part and a second wall part which are respectively extended to a predetermined height to have a tilt portion at both sides of a bottom of a predetermined width to thereby form a predetermined space therein;
    a winding coil formed by winding a coil for several times at a space formed inside the bobbin body; and
    a cover manufactured by molding and combined with the bobbin body to cover the winding coil.

* * * * *

UNITED STATES PATENT AND TRADEMARK OFFICE
CERTIFICATE OF CORRECTION

PATENT NO.      : 6,882,075 B2
DATED           : April 19, 2005
INVENTOR(S)     : Jin-Yeong Do et al.

It is certified that error appears in the above-identified patent and that said Letters Patent is hereby corrected as shown below:

Title page,
Item [75], Inventors, please replace "Jin-Yoong Do" with -- Jin-Yeong Do --.

Signed and Sealed this

Thirteenth Day of September, 2005

JON W. DUDAS
*Director of the United States Patent and Trademark Office*